US006664453B2

(12) United States Patent
Ito et al.

(10) Patent No.: US 6,664,453 B2
(45) Date of Patent: Dec. 16, 2003

(54) GUITAR NECK ATTACHMENT STRUCTURE

(75) Inventors: Osamu Ito, Hamamatsu (JP); Kiyoshi Minakuchi, Hamamatsu (JP)

(73) Assignee: Yamaha Corporation, Shizuoka (JP)

( * ) Notice: Subject to any disclaimer, the term of this patent is extended or adjusted under 35 U.S.C. 154(b) by 0 days.

(21) Appl. No.: 10/091,951

(22) Filed: Mar. 5, 2002

(65) Prior Publication Data

US 2002/0121174 A1 Sep. 5, 2002

(30) Foreign Application Priority Data

Mar. 5, 2001 (JP) ....................................... 2001-059748

(51) Int. Cl.[7] ................................................ G01D 3/00

(52) U.S. Cl. .............................. 84/293; 84/291; 84/723

(58) Field of Search .......................... 84/293, 291, 267, 84/723

(56) References Cited

U.S. PATENT DOCUMENTS 3,915,049 A * 10/1975 Bean .......................... 84/743
4,254,683 A * 3/1981 Nulman ....................... 84/727
4,896,578 A * 1/1990 Marx .......................... 84/313
6,194,644 B1 * 2/2001 Hendrickson ................ 84/291
6,262,353 B1 * 7/2001 Murray ........................ 84/290

FOREIGN PATENT DOCUMENTS

JP S55-2460 1/1980
JP S55-36872 8/1980

* cited by examiner

*Primary Examiner*—Shih-Yung Hsieh
(74) *Attorney, Agent, or Firm*—Koda & Androlia

(57) ABSTRACT

In an attachment structure for attaching a neck to a guitar body, particularly an electric guitar body, a connecting portion is formed at a heel portion of the neck, and this connecting plate is engaged with an engagement recess formed in the backside of the guitar body and fastened in place by fastening screws. The pickup units are installed on the guitar body from the backside so as to positionally correspond to the connecting portion of the neck. One end of a balance spring is connected to the tremolo mechanism disposed on the guitar body and another end of the balance spring is connected to the connecting plate of the neck.

6 Claims, 3 Drawing Sheets

GUITAR NECK ATTACHMENT STRUCTURE

BACKGROUND OF THE INVENTION

1. Field of the Invention

The present invention relates to a guitar and more particularly to a structure for attaching a neck to a guitar body particularly to a solid type electric guitar body.

2. Prior Art

Ordinarily, electric guitars are classified into two types according to differences in the structure of the guitar body: a solid type and a semi-acoustic type. The body of the solid type electric guitars is worked into a particular shape from, ordinarily, a single slab of wood; and such solid type electric guitars are further classified into two types. In one type, the body is completely solid as shown in Japanese Utility Model Application Publication (Kokoku) No. S55-36872. In another type, as disclosed in Japanese Utility Model Application Publication (Kokoku) No. S55-36872, a part of the guitar body is removed so that the guitar body has a hollow interior.

In semi-acoustic type guitars, the body is formed in the same manner as the resonating body of an acoustic guitar from outer plates (a front plate and a back plate) and side plates consisting of a wooden material. An example of this type of guitar is found in Japanese Utility Model Application Publication (Kokoku) No. S55-2460.

A conventional solid type electric guitar is shown in FIGS. 3A and 3B.

In this prior art electric guitar 10, the guitar body is referred to by the reference numeral 1. The reference numeral 2 is a neck, 3 refers to strings, and 4 refers to tuning pegs. In addition, the reference numeral 5 is a tremolo mechanism, 6 refers to pickup units that convert the vibrations of the strings 3 into electrical signals, 7 is a tremolo arm, and 8 refers to knobs that for adjusting the sound volume, tone quality, etc.

The interior of the guitar body 1 is completely solid as seen from FIG. 3B. The heel portion 2A of the neck 2 is fastened to the center of the upper surface of the front-end part of the guitar body 1 by a plurality of fastening screws 11. The strings 3 ordinarily consist of six (or twelve) strings; and one end of each string 3 is anchored by being wound on one of the tuning pegs 4, while the other end of each string is anchored to the bridge base 12 of the tremolo mechanism 5.

In the neck attachment structure of this conventional electric guitar 10, as seen from FIG. 3B, a neck joining part 14 to which the heel portion 2A of the neck 2 of the guitar body 1 is joined comprises a receiving plate 15 and a recess 16. The heel portion 2A is engaged with the recess 16 and is fastened to the upper surface of the receiving plate 15 by a plurality of fastening screws 11.

However, in this neck attachment structure, the receiving plate 15 must be formed long so as to increase the strength of the connection between the guitar body 1 and the neck 2. As a result, the length L of the heel portion 2A of the neck 2 is inevitably long also, having the same length as the receiving plate 15. Thus, playing is difficult when the guitar is played by pressing the portions of the strings that are close to the guitar body 1.

More specifically, the neck 2 is formed so that the thickness and width of the heel portion 2A are the greatest in order to ensure sufficient strength, and the neck 2 gradually becomes more slender toward the head 2B. Accordingly, a player who has small hands and short fingers cannot sufficiently reach the strings 3, and the strings 3 are not accurately pressed. This is significant when playing in a high position, i.e., when the player grips the area near the heel portion 2A with his hand and plays the strings near the heel portion 2A with fingers of such hand gripping the heel portion.

The above neck attachment structure has further problems. The joined area of the heel portion 2A of the neck 2 and the upper surface 1*a* of the guitar body is visible. Since the pickup units 6 are fitted in attachment holes 17 formed in the upper surface 1*a* of the guitar body 1 and fastened by screws, these screws are exposed at the upper surface 1*a* of the guitar body 1 and are thus visible to the player. Thus, the external appearance is spoiled.

Furthermore, prior art electric guitars includes balance springs 18. The balance springs 18 apply a rotational moment, which is oriented in the opposite direction from the rotational moment created by the tension of the strings 3, to the bridge base 12 of the tremolo mechanism 5. One end of each balance spring 18 is connected to the bridge base 12 and another end to the guitar body 1 as best seen from FIG. 3B. When the string vibrations that transmitted to the tremolo mechanism 5 (among the vibrations of the strings 3 generated during playing) are further transmitted to the neck 2 via the guitar body 1, a vibration transmission loss occurs between the guitar body 1 and the neck 2. As a result, a good sound volume and tone quality is not obtained.

SUMMARY OF THE INVENTION

Accordingly, the present invention is to solve the above-described conventional problems.

It is an object of the present invention to provide a guitar neck attachment structure that improves playability in a high position, improves the sound volume and tone quality, etc., and also provides a clean external appearance.

The above object is accomplished by a unique structure for an attachment structure for attaching a guitar neck to a guitar body, and in the present invention, the neck has a connecting plate at its heel portion, and this connecting plate is fastened to the underside of the guitar body.

In this structure, since the connecting plate disposed on the heel portion of the neck is fastened to the underside of the guitar body, there is no need to form a large recess in the upper surface or in the front of the guitar body for accommodating the heel portion.

In addition, in the present invention, the guitar body is a solid type body, and a recess for attaching the connecting plate of the neck therein is formed in the underside of the guitar body so that the connecting plate of the neck engages with the recess.

Accordingly, the connecting plate is engaged with the recess that is for attaching the neck, and it is prevented from protruding from the underside of the guitar body.

Furthermore, in the present invention, a tremolo mechanism is provided on an upper surface of the guitar body so that it positionally corresponds to the connecting plate of the neck, and a balance spring connected at its one end thereof to the tremolo mechanism is connected at another end thereof to the connecting plate.

Accordingly, with this structure, the string vibrations transmitted to the tremolo mechanism is further transmitted to the neck directly via the balance spring.

In addition, in the present invention, pickup units are installed on the upper or front surface of the guitar body from the underside or from the back of the guitar body, so that the pickup units are positioned so as to correspond to the connecting plate of the neck.

In this structure, since the pickup units are mounted from the underside or from the back of the guitar body, the fastening screws are screwed in from the back so as not to be seen from the front.

DETAILED DESCRIPTION OF THE INVENTION

Figure 3A:
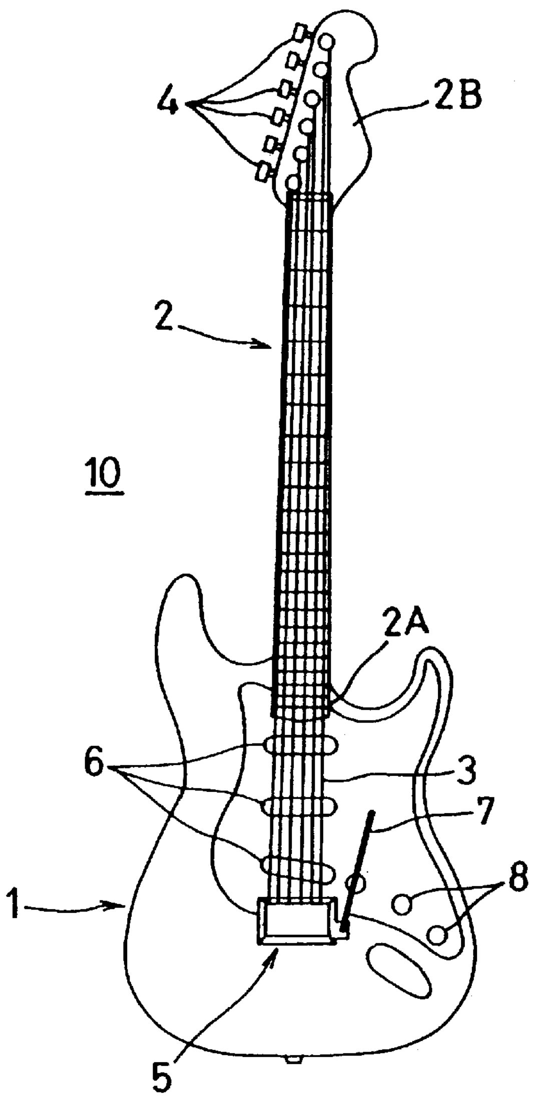
FIG. 3A PRIOR ART
FIG. 3A is a top view of a conventional solid type electric guitar.

The present invention will be described below in detail with reference to one embodiment illustrated in the accompanying drawings. The constituting elements described with reference the prior art guitar in FIG. 3 are labeled with the same reference numerals, and a description of such elements is omitted.

Figure 1:
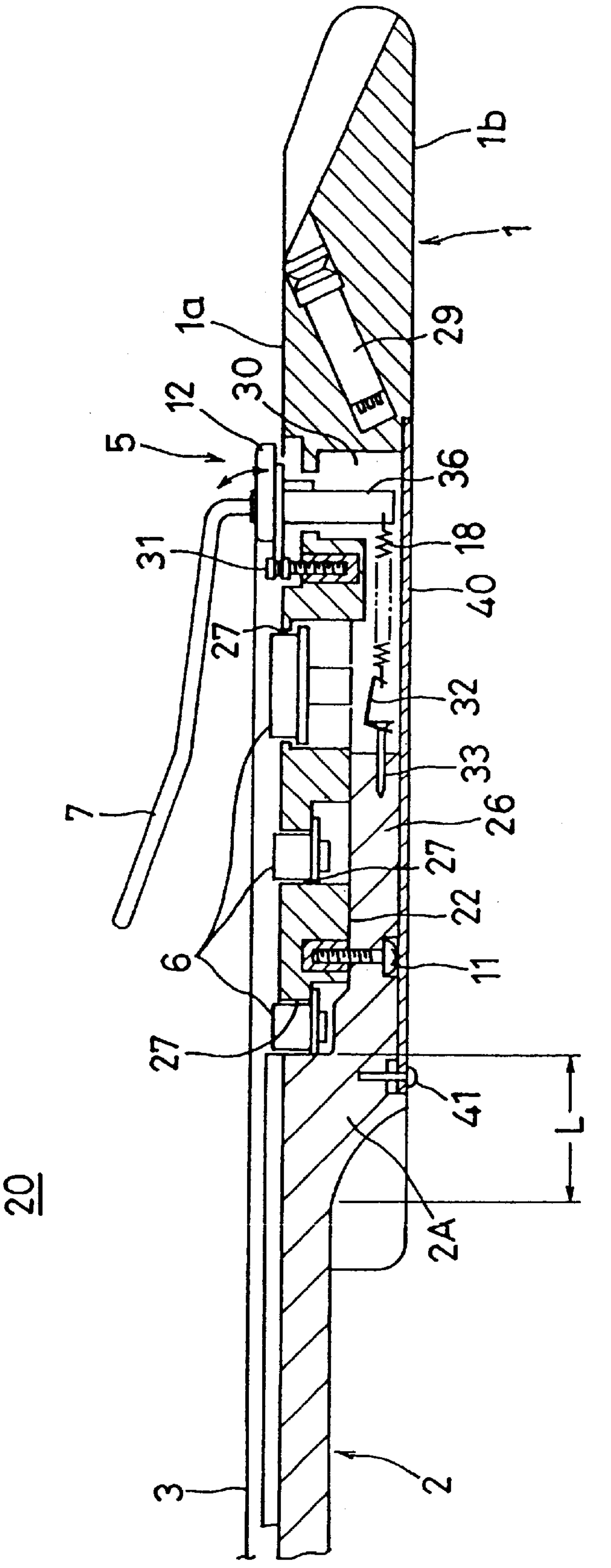
FIG. 1 is a sectional view illustrating one embodiment of the guitar neck attachment structure according to the present invention.
Figure 2:
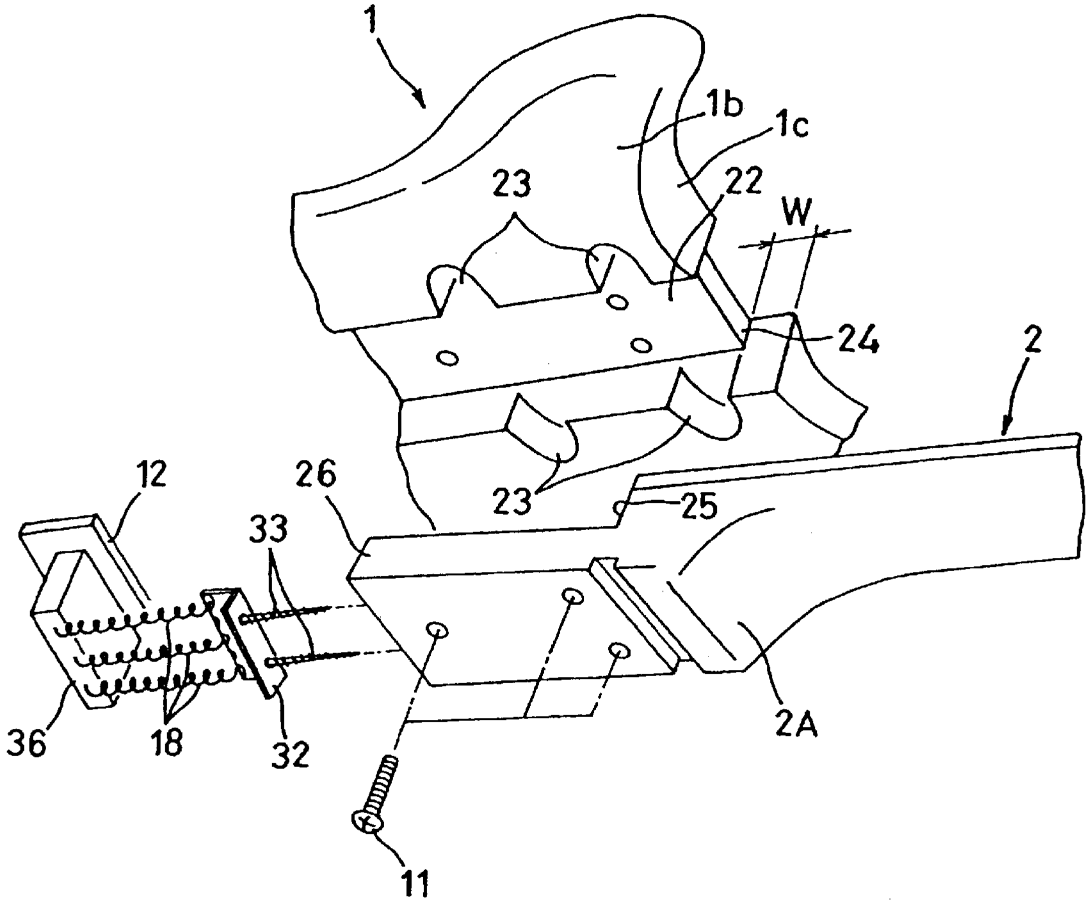
FIG. 2 is an exploded perspective view of the guitar neck attachment structure of the present invention thereof.

In FIGS. 1 and 2, the solid type electric guitar that is referred to by the reference numeral 20 is comprised of a guitar body 1, a neck 2, strings 3, a tremolo mechanism 5, pickup units 6, and other elements.

The guitar body 1 is made of wood and is thus substantially solid in its interior part. The neck 2 has a heel portion 2A. The heel portion 2A is fastened to the underside or to the back of the top end or the head side end of the guitar body 1 by a plurality of fastening screws 11. An engagement recess 22 is formed in the center (with respect to the direction of width) of the undersurface (or of the back surface) 1*b* of the guitar body 1. One end of the engagement recess 22 opens in the top end surface 1*c* of the guitar body 1, and the other end of the engagement recess 22 extends to the vicinity of the rear end of the guitar body 1.

Substantially semicircular side recesses 23 are formed in both side walls of the engagement recess 22 so that the side recesses 23 engage with fastening portions of the pickup units 6.

A top end recess 24 is formed in the center of the top end surface 1*c* of the guitar body 1. The top end recess 24 and the engagement recess 22 are the same in width, and the top end recess 24 and the engagement recess 22 are formed continuously so as to communicate with each other. The depth W of the top end recess 24 is set so to be shallower than the length L of the heel portion 2A of the neck 2.

The heel portion 2A of the neck 2 that is joined to the guitar body 1 has a width that allows the heel portion 2A to be engaged with the top end recess 24. The height of the heel portion 2A is substantially equal to the thickness of the guitar body 1.

Furthermore, the neck 2 has a connecting plate 26 integrally formed so as to extend from the lower portion of the end surface 25 of the heel portion 2A, the end surface 25 facing the guitar body 1. The connecting plate 26 has substantially the same width as the heel portion 2A of the neck 2 and is smaller (or thinner) than the depth of the engagement recess 22 of the guitar body 1. The connecting plate 26 is engaged with the engagement recess 22 from below or from the back of the guitar body 1 and is fastened in place by fastening screws 11.

Figure 3B:
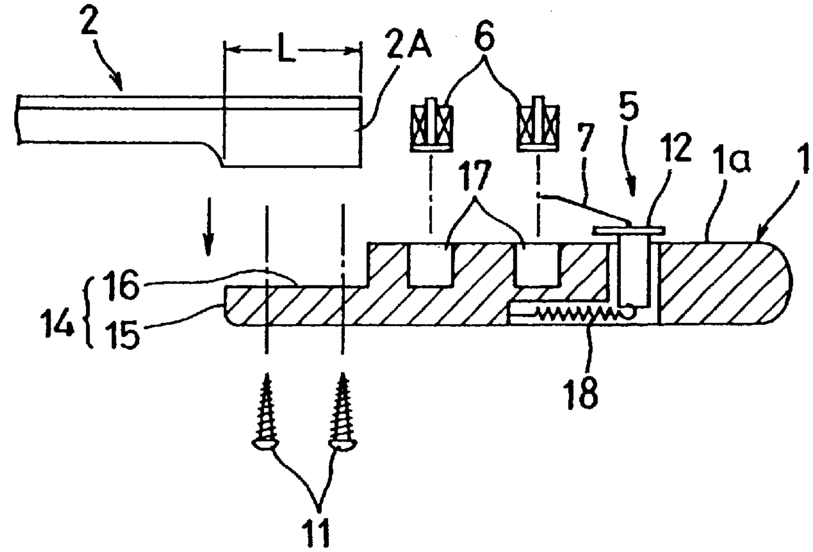
FIG. 3B PRIOR ART
FIG. 3B shows the neck attachment structure of this prior art guitar.

More specifically, in the neck connecting structure of the present invention, the neck 2 has the connecting plate 26 disposed on the heel portion 2A, and the guitar body 1 is not formed with the receiving plate 15 shown in FIG. 3B at the front end; and this connecting plate 26 is fastened to the underside of the guitar body 1. This connecting plate 26 is brought to engage with the engagement recess 22 and positioned on the underside or in the back of the guitar body 1. Accordingly, the length L of the heel portion 2A can be made shorter compared to prior art neck heel portion regardless of the length of the connecting plate 26.

Three attachment holes 27 that communicate with the engagement recess 22 are formed at specified intervals in the stringing direction of the strings 3 in the center (with respect to the direction of width) of the upper surface 1*a* of the guitar body 1. The pickup units 6 are respectively engaged with these attachment holes 27 from the undersurface 1*b* side so that the pickup units 6 are prevented from slipping out of the attachment holes 27 toward the upper surface 1*a* of the guitar body 1. The pickup units 6 are fastened in place by fastening screws (not shown); and each one of the pickup unit 6 is electrically connected to an output jack 29 embedded in the guitar body 1.

Furthermore, a hole 30 to which the tremolo mechanism 5 is attached is formed in the center (with respect to the direction of width) of the upper surface 1*a* of the guitar body 1 near the rear end of the guitar body 1. The hole 30 is opened so as to pass entirely through the guitar body 1 from the upper surface 1*a* to the undersurface 1*b*. The hole 30 communicates with the rear end of the engagement recess 22.

The tremolo mechanism 5 raises and lowers the musical interval by repeatedly varying the tension of the strings 3 with a short period, thus producing a special acoustical effect known as the so-called tremolo effect. This tremolo mechanism 5 has a bridge base 12 that is disposed on the guitar body 1 so as to swing in the direction indicated by the curved arrow in FIG. 1.

The bridge base 12 supports one end of each string 3 by means of a bridge main body (not shown) which is disposed on the upper surface; and a tremolo arm 7 is attached near one side of the bridge base 12.

The front end of the bridge base 12 is pressed against two fulcrum screws 31 (which are installed in upright positions on the left and right on the upper surface 1*a* of the guitar body 1) by the tension of the strings 3 and the spring force of a balance spring 18.

The balance spring 18 is a tension coil spring. One end of the spring 18 is anchored by means of an attachment fitting 32 and a fastening screw 33 to the tip end of the connecting plate 26. The other end of the spring 18 is anchored to the lower end of a spring-anchoring portion 36 that extends downward from the undersurface of the bridge base 12. Thus, the balance spring 18 is positioned inside the hole 30 and engagement recess 22 of the guitar body 1. As a result, the spring 18 causes a moment, which is oriented in the opposite direction from the moment created by the tension of the strings 3, to be applied to the bridge base 12.

As seen from the above, in the tremolo mechanism 5, the bridge base 12 is balanced by the balance spring 18 with the moment created by the tension of the strings 3. When the bridge base 12 is repeatedly pivoted by the tremolo arm 7 in the vertical direction about the fulcrum screws 31 so as to destroy the balanced state of the bridge base 12, the tension of the strings 3 are repeatedly changed. As a result, the tremolo effect is applied to the playing sound.

The above described structure of the tremolo mechanism 5 is well known as disclosed in Japanese Utility Model Application Laid-Open (Kokai) Nos. H2-119300, S63-44864 and S63-33242, etc.). Accordingly, a further description of the tremolo mechanism 5 will be omitted.

The reference numeral 40 is a cover that covers the engagement recess 22 and hole 30. The cover 40 is fastened to the undersurface 1*b* of the guitar body 1 by a plurality of fastening screws 41.

As seen from the above, in the neck attachment structure of the present invention, the connecting plate 26 is integral to the heel portion 2A of the neck 2, and this connecting plate 26 is fastened in place by being engaged with the engagement recess 22 formed in the undersurface 1*b* of the guitar body 1. Accordingly, the length L of the heel portion 2A can be shortened compared to the conventional neck attachment structure as shown in FIG. 3. Thus, the heel portion 2A can be smaller, and the strings 3 can be assuredly pressed by the fingers upon when playing high position, thus improving the playability of the guitar.

Also, it is only necessary to form the small top end recess 24 in the upper surface 1*a* of the guitar body 1 so that a part of the heel portion 2A of the neck 2 is engaged therewith. Accordingly, the upper surface 1*a* of the guitar body 1 has a clean appearance, and thus the guitar has an improved external appearance. The top end recess 24 prevents inclination of the neck 2 in the left-right direction, but it is not absolutely necessary.

Furthermore, in the guitar of the present invention, the pickup units 6 are mounted from the undersurface side of the guitar body 1. Accordingly, there is no need to attach fastening screws for fastening the pickup units 6 from the upper surface side of the guitar body. Thus, the guitar has a clearer external appearance in this respect either.

In addition, in the present invention, since one end of the balance spring 18 of the tremolo mechanism 5 is anchored to the connecting plate 26, the string vibrations transmitted to the tremolo mechanism 5 can be transmitted directly to the neck 2. Accordingly, the transmission loss of the string vibrations is small, the sound is kept for a long duration, and the sound volume and tone quality can be improved.

As described above, the guitar neck attachment structure of the present invention is simple in structure and improves the playability of the guitar in a high position. Furthermore, the guitar neck attachment structure improves the sound volume, tone quality and sound duration time, and also it provides the upper or front surface of the guitar body so as to have a clean appearance. Accordingly, the present invention is suitable for use in solid type electric guitars.

What is claimed is:

1. A guitar neck attachment structure, wherein a neck of guitar is provided with a connecting portion disposed at a heel portion of said neck, with said connecting portion fastened to an underside of a guitar body of said guitar, a tremolo mechanism is provided on said guitar body, and a balance spring is provided between said tremolo mechanism and said connecting portion of said neck so that an end of said balance spring coupled to said tremolo mechanism and another end of said balance wring is directly connected to said connecting portion.

2. The guitar neck attachment structure according to claim 1, wherein said guitar body is a solid type body, and a recess is formed in an underside of said guitar body so that said connecting portion of said neck is engaged with said recess.

3. The guitar neck attachment structure according to claim 2, wherein a pickup unit is disposed on an upper surface of said guitar body so as to positionally correspond to said connecting portion of said neck, said pickup unit being installed from an undersurface side of said guitar body.

4. The guitar neck attachment structure according to claim 1, wherein a pickup unit is disposed on an upper surface of said guitar body so as to positionally correspond to said connecting portion of said neck, said pickup unit being installed from art undersurface side of said guitar body.

5. The guitar neck attachment structure according to claim 1, wherein a pickup unit is disposed on an upper surface of said guitar body so as to positionally correspond to said connecting portion of said neck, said pickup unit being installed from an undersurface side of said guitar body.

6. The guitar neck attachment structure according to claim 1, wherein a recess is provided in said guitar body, both said tremolo mechanism and said connecting portion extend into said recess and said balance spring is provide in said recess between said tremolo mechanism and said connecting portion.

* * * * *